United States Patent
Brown et al.

(10) Patent No.: US 11,673,687 B2
(45) Date of Patent: Jun. 13, 2023

(54) PROGRAMABLE DEFORMATION OF ELASTOMERIC PARTS USING INTERNAL LATTICE STRUCTURES

(71) Applicant: The Boeing Company, Chicago, IL (US)

(72) Inventors: Terrence D. Brown, Ballwin, MO (US); William R. Miller, St. Charles, MO (US)

(73) Assignee: THE BOEING COMPANY, Arlington, VA (US)

( * ) Notice: Subject to any disclaimer, the term of this patent is extended or adjusted under 35 U.S.C. 154(b) by 722 days.

(21) Appl. No.: 16/535,838

(22) Filed: Aug. 8, 2019

(65) Prior Publication Data

US 2021/0039809 A1   Feb. 11, 2021

(51) Int. Cl.
| | |
|---|---|
| *B64F 1/00* | (2006.01) |
| *B33Y 10/00* | (2015.01) |
| *B33Y 80/00* | (2015.01) |
| *B29C 64/118* | (2017.01) |
| *B29L 31/30* | (2006.01) |

(52) U.S. Cl.
CPC ............ *B64F 1/005* (2013.01); *B29C 64/118* (2017.08); *B33Y 10/00* (2014.12); *B33Y 80/00* (2014.12); *B29L 2031/30* (2013.01)

(58) Field of Classification Search
CPC ....................................................... B64F 1/005
See application file for complete search history.

(56) References Cited

U.S. PATENT DOCUMENTS

| | | | | |
|---|---|---|---|---|
| 4,336,296 A | * | 6/1982 | Fukuta ................. | D03D 41/004 442/205 |
| 5,039,567 A | * | 8/1991 | Landi .................. | B29C 66/1122 428/116 |
| 6,067,480 A | * | 5/2000 | Stuffle ................... | B29C 64/118 700/109 |
| 2004/0161339 A1 | * | 8/2004 | Breakwell ................ | F02C 7/00 416/245 R |
| 2013/0259687 A1 | * | 10/2013 | Suciu ........................ | F02C 7/04 416/1 |

(Continued)

FOREIGN PATENT DOCUMENTS

| | | |
|---|---|---|
| CN | 105564667 A | 5/2016 |
| EP | 2455643 A1 | 5/2012 |
| JP | 2003287150 A | 10/2010 |

OTHER PUBLICATIONS

Extended European Search Report dated Jan. 13, 2021 in corresponding European Application No. 20185222.5, 7 pages.

(Continued)

*Primary Examiner* — Gerald L Sung
(74) *Attorney, Agent, or Firm* — MH2 Technology Law Group LLP

(57) ABSTRACT

A compressible part having a solid portion and a compressible portion. The solid portion includes a first polymer material. The compressible portion has a lattice structure adjacent to the solid portion. The compressible portion includes a second polymer material that is an elastomeric polymer. The lattice structure is configured to provide for increased elastic deformation of the compressible part under compressive stress compared to the same compressible part made completely of the elastomeric polymer in solid form.

29 Claims, 7 Drawing Sheets

(56) References Cited

U.S. PATENT DOCUMENTS

2017/0107906 A1* 4/2017 Oggero .................. F01D 9/041
2020/0309028 A1* 10/2020 Murugappan ......... F04D 29/664

OTHER PUBLICATIONS

Palermo, "Fused deposition modeling: most common 3D printing method," https://www.livescience.com/39810-fused-deposition-modeling.html, published Sep. 19, 2013, 10 pages.
Aspeby, Communication pursuant to Article 94(3) EPC dated Apr. 26, 2022 in corresponding European application No. 20 185 222.5, 4 pages.

* cited by examiner

PROGRAMABLE DEFORMATION OF ELASTOMERIC PARTS USING INTERNAL LATTICE STRUCTURES

DETAILED DESCRIPTION

Field of the Disclosure

The present disclosure is directed to a programmable deformation of elastomeric parts using internal lattice structures.

BACKGROUND

Compressible parts can be employed in a variety of applications. For instance, blown foam rubber is used in inlet plugs, which are known for covering secondary heat exchanger inlets of aerospace vehicles when the vehicles are not in use. One such inlet plug is shown in FIGS. 7A and 7B. The inlet plug is inserted into secondary heat exchanger inlets 118 (FIG. 6) and thereby protects the inlets 118 from moisture, insects and other debris. In the past, such inlet plugs have been held in place in the secondary heat exchanger inlets 118 by a friction fit. The term "friction fit" is defined herein as a fastening between two parts which is achieved by friction after the parts are pushed together, rather than by any other means of fastening. In particular, a blown foam rubber pad 10 is attached at one end of an outer cover of the inlet plug, as shown in FIG. 7A. The outer cover is made of metal, plastic and rubber impregnated cloth. When the inlet plug is pushed into the secondary heat exchanger inlet 118, the blown foam rubber pad 10 is compressed and provides a compressive force against the side of the secondary heat exchanger inlet, thereby holding the inlet plug in place by increased friction caused by the compressive force. However, it has been found that over time the blown foam rubber pads deform to the shape of the secondary heat exchanger inlets, as shown in FIG. 7B, and no longer provides sufficient compressive force to hold the inlet plugs in place.

Thus, there is a need in the art for materials and processes that can provide both compressibility and long term compressive force.

SUMMARY

The present disclosure is directed to a compressible part. The compressible part comprises a solid portion comprising a first polymer material; and a compressible portion comprising a lattice structure adjacent to the solid portion. The compressible portion comprises a second polymer material that is an elastomeric polymer. The lattice structure is configured to provide for increased elastic deformation of the compressible part under compressive stress compared to the same compressible part made completely of the elastomeric polymer in solid form.

The present disclosure is directed to an inlet plug. The inlet plug comprises an outer cover and a compressible part attached to the outer cover. The compressible part comprises a solid portion comprising a first polymer material and a compressible portion comprising a lattice structure adjacent to the solid portion. The compressible portion comprises a second polymer material that is an elastomeric polymer. The lattice structure is configured to provide for increased elastic deformation of the compressible part under compressive stress compared to the same compressible part made completely of the elastomeric polymer in solid form.

The present disclosure is also directed to a compression fit system. The system comprises a compressible part and a receptacle for receiving the compressible part. The receptacle is sized so that the compressible part is insertable in the receptacle and maintainable therein by a friction fit. The compressible part comprises a solid portion comprising a first polymer material and a compressible portion comprising a lattice structure adjacent to the solid portion. The compressible portion comprises a second polymer material that is an elastomeric polymer. The lattice structure is configured to provide for increased elastic deformation of the compressible part under compressive stress compared to the same compressible part made completely of the elastomeric polymer in solid form.

The present disclosure is further directed to a method of making a compressible part. The method comprises forming a compressible part by three-dimensional printing. The compressible part comprises: (i) a solid portion comprising a first polymer material and (ii) a compressible portion comprising a lattice structure adjacent to the solid portion. The compressible portion comprises a second polymer material that is an elastomeric polymer. The lattice structure increases elastic deformation of the compressible part under compressive stress compared to the same compressible part made completely of the elastomeric polymer in solid form.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates aspects of the present teachings and together with the description, serve to explain the principles of the present teachings.

Figure 1:
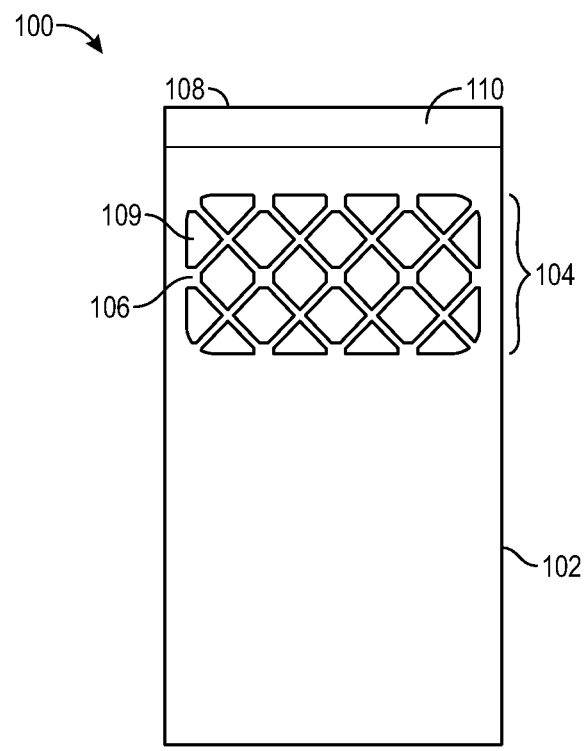
FIG. 1 illustrates a side view of a compressible part, according to an example of the present disclosure.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The present disclosure is directed to a compressible part that includes a lattice structure. The amount of material employed in the lattice structure and the lattice structure design can be chosen to achieve the desired compressibility of the part. The compressible part can be employed in various applications, such as, for example, to provide sufficient compressibility and durability to maintain a friction fit when inserted into a receptacle.

FIG. 1 illustrates an example of a compressible part 100 comprising a solid portion 102 comprising a first polymer material and a compressible portion 104. Compressible portion 104 includes a lattice structure 106 that is adjacent to, and physically attached to, and/or at least partially and in some embodiments fully encompassed within, the solid portion 102. Compressible portion 104 comprises a second polymer material that is an elastomeric polymer. The lattice structure 106 is configured to provide for increased elastic deformation of the compressible part 100 under compressive stress compared to the same compressible part made completely of the elastomeric polymer in solid form (e.g., the part is made from solid elastomer without the lattice structure). The solid portion 102 can optionally include one or more holes 103 to allow for easy attachment to another part or structure, as will be illustrated below.

The particular configuration of the lattice structure 106 can be chosen to provide the desired compressibility and durability. For example, increasing the percentage of polymer material per unit volume of the lattice, thereby decreasing the volume of air gaps in the lattice, will decrease the compressibility; while decreasing the percentage of polymer material per unit volume will increase the compressibility. The percentage of polymer material per unit volume can be as low as 5% or as high as 95% depending on the stiffness desired. The lattice can have lattice patterns that include any geometrical shape. For example, a lattice pattern comprised of rectangular, diamond, triangle or other polygon patterns having from about 3 to about 10 sides, or about 4 to about 8 sides, circular or oval shape patterns, spiral patterns or any other suitable lattice pattern. Diamonds shapes are easiest to design. With 3D printing technology, the ability to create a variety of other shapes, such as spiral, spring like structures, is possible, as the structure can be strong enough to self-support during fabrication. The lattice can have a single pattern or multiple different patterns as part of the same lattice structure. For example, FIG. 3B, discussed in greater detail below, illustrates a first lattice pattern 111A of repeating diamond shapes and a second lattice pattern 111B within the first lattice pattern 111A. The second lattice pattern 111B can be the same as, or different than, the first lattice pattern 111A, and can be rotated at an angle, such as 90 degrees, relative to the first lattice pattern 111A so as to support the first lattice pattern. For example, where both the first lattice pattern 111A and the second lattice pattern 111B comprise repeating diamond shape patterns, the lattice patterns 111A and 111B can be physically attached with one another at the intersecting diamond shapes. The lattice pattern chosen can provide an asthetic appearance, while being strong and stable. Employing one or more second lattice patterns at a 90 degree off set allows the first and second lattice patterns to support each other at adjacent intersections, thereby increasing the stability of the structure while still allowing compressibility. Such lattice structures designs can also allow for an outer "skin" to be formed on the sides thereof, (e.g., on the top, front and back of the lattice structure), thereby allowing fabrication of a plug that can effectively act as a barrier for moisture, dirt, bugs, and debris when installed.

Figure 3A:
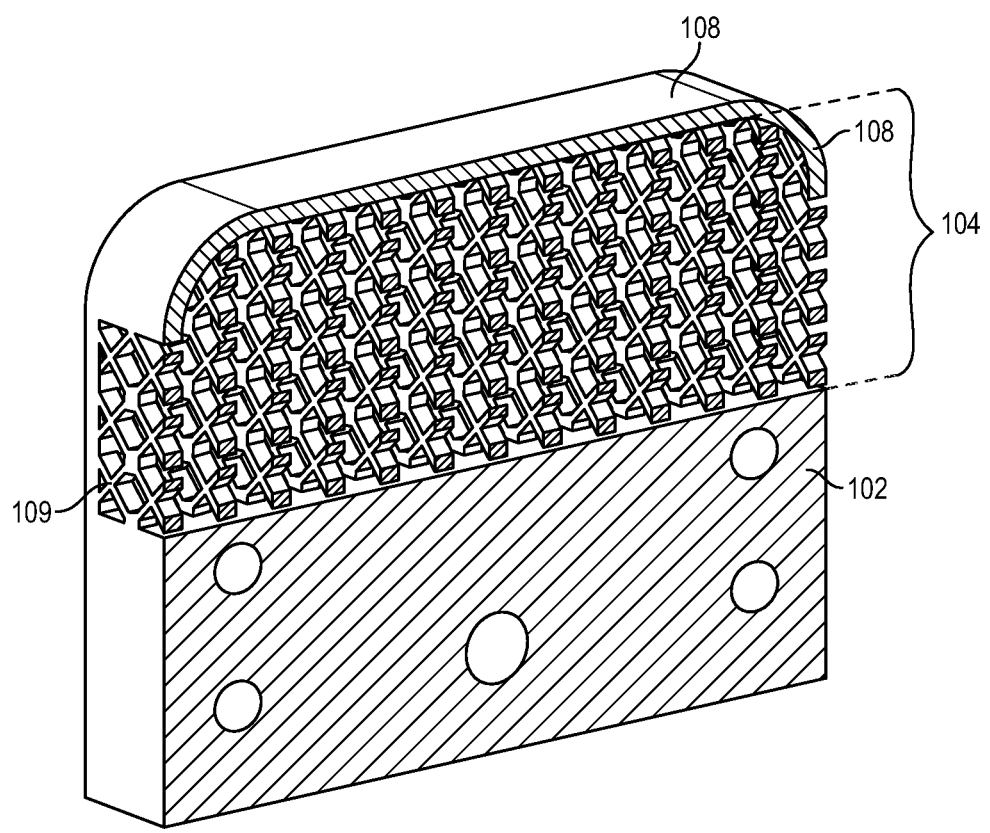
FIG. 3A illustrates a perspective, cut-away view of a compressible part, according to an example of the present disclosure.
Figure 3B:
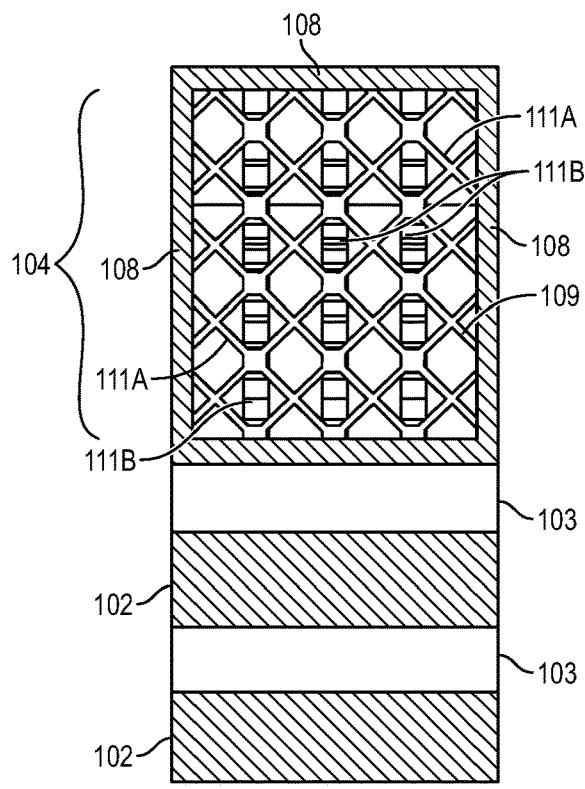
FIG. 3B illustrates a cut-away, side view of a compressible part, according to an example of the present disclosure.

A solid layer 108 of polymer can surround one or more side and/or top portions of the lattice structure 106, as illustrated, for example, in FIG. 1, and shown in more detail in FIGS. 3A and 3B. The solid layer 108 can increase the strength and improve structural integrity of the lattice region 106. In certain applications the solid layer 108 can provide a barrier that reduces or prevents moisture, insects, dust and so forth from penetrating the lattice structure 106. Optionally, side portions 109 of the lattice structure 106 can remain open in order to increase compressibility and also to allow air out during compression. In an alternative example, the lattice structure 106 can be entirely surrounded by a solid layer 108, thereby sealing the lattice structure.

The first polymer material can be the same as, or different than, the second polymer material. In an example, the first polymer material is an elastic material that is different than the second polymer material. In another example, the first polymer material is an elastic material that is the same as the second polymer material. Employing the same elastic polymer for both the solid portion and the compressible portion allows both portions to be integrally formed together (e.g., by 3D printing or any other suitable method) as a single part with no additional assembly required.

Figure 2:
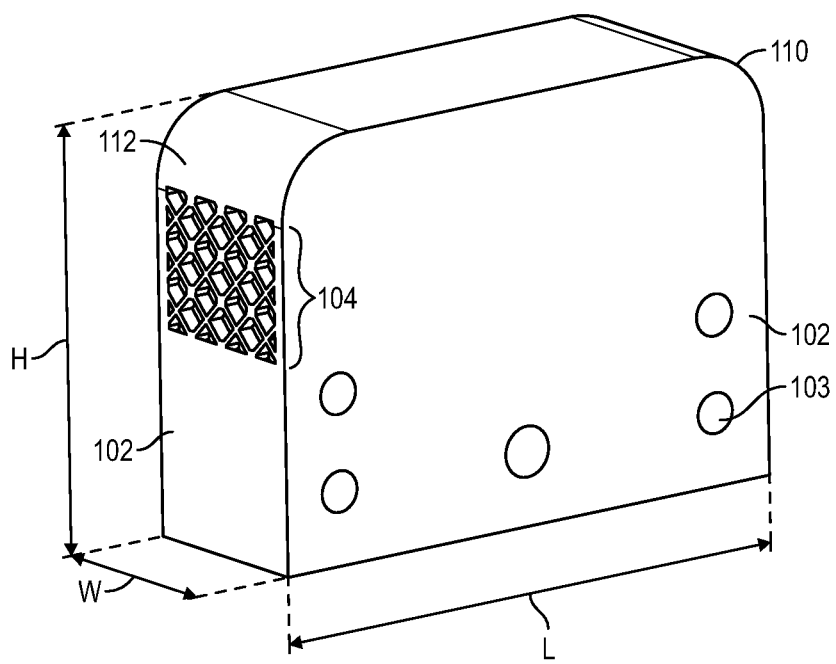
FIG. 2 illustrates a perspective view of a compressible part, according to an example of the present disclosure.

As shown in FIGS. 1 and 2, the compressible part can be in the form of a pad. As an example, the compressible part has a length dimension, L, a height dimension, H, and a width dimension, W, as shown in FIG. 2. The compressible portion 104 may extend, for example, for about 10 to about 95% of the height dimension, H. In another example, the compressible portion 104 may extend, for example, for about 25% to about 70%, or about 30% to about 50%, of the height dimension. The compressible portion extends for about 70% to about 100%, such as about 80% to about 100%, such as about 90% to about 100%, of the length dimension, L; and about 70% to about 100%, such as about 80% to about 99%, such as about 90% to about 95%, of the width dimension, W. The relative size of the compressible portion can range from about 10% to about 95%, such as 20% to about 60%, such as about 30 to about 50%, by volume of the compressible part.

The dimensions of the compressible part 100 can be chosen as desired to form a pad of the desired shape and size. In an example, the height dimension, H, ranges from about 0.5 inch to about 8 inches, such as about 1 inch to about 6 inches, or about 1.25 inches to about 2 inches; the length dimension, L, ranges from about 0.5 inches to about 10 inches, such as about 1 inch to about 4 inches, or about 2 inches to about 3 inches; and the width dimension, W, ranges from about 0.3 inches to about 3 inches, or about 0.5 inches to about 2 inches, or about 0.5 inches to about 1.5 inches.

The compressible portion 104 has a first width edge 110 and a second width edge 112 opposing the first width edge 110. In an example, the first width edge 110 and the second width edge 112 are curved, as shown in FIG. 2. The curve of the first width edge 110 and second width edge 112 can allow for easy insertion of the compressible portion 104 into a receptacle, as shown, for example, in FIG. 3C.

The elastomeric material is chosen to provide properties that can aid in achieving both the desired durability and compressibility of the compressible part, including a desired hardness, tensile strength and elongation at break. As examples, the elastomeric material of compressible part 100 has a Shore A Hardness of from about 40 to about 100, such as about 50 to about 90, such as about 60 to about 80, or about 65 to about 75, or about 68 to about 73, or from about 70 to about 72, or about 70. The elastomeric material has a tensile strength of, for example, from about 5 MPa to about 15 MPa, such as about 8 MPa to about 12 MPa, or about 10 MPa to about 11 MPa. The elastomeric material has an elongation at break of, for example, about 210% to about 410%, such as about 230% to about 390%, or about 240% to about 480%. Employing materials with hardness, tensile strength and elongation at break within these ranges can provide for compressible parts that last for long periods of time without fatiguing out. The tensile strength and elongation at break can be determined using ASTM D412.

Any elastomer that provides the desired properties (e.g., is flexible and can be formed to the desired shape by 3D printing, molding or another method) can be employed. For example, elastomers having one or more of a Shore A hardness within the ranges described herein, tensile strength within the ranges described herein and elongation at break within the ranges described herein, can potentially be employed. As examples, the elastomeric material can be polyurethane, polyethylene plastic, rubber or mixtures thereof. In an example, the elastomeric polymer is photo-curable. Commercial examples of suitable elastomeric polymers include TPU 92A, available from Stratasys LTD, of Rehovot, Israel; and CARBON EPU 40, available from Carbon3D, Inc., of Redwood City, Calif.

The compressible part 100 can be made using any suitable known or later developed methods. An example of a suitable method of making a compressible part will now be described. The method comprises forming a compressible part by three-dimensional printing. The compressible part can be any of the compressible parts described herein. For example, the compressible part comprises: (i) a solid portion comprising a first polymer material and (ii) a compressible portion comprising a lattice structure adjacent to the solid portion. The compressible portion comprises a second polymer material that is an elastomeric polymer. The lattice structure increases elastic deformation of the compressible part under compressive stress compared to the same compressible part made completely of the elastomeric polymer in solid form. In an example, the three-dimensional printing process employed is fused deposition modelling. Suitable fused deposition modelling techniques are well known in the art. In an example, the first polymer material and the second polymer material are the same elastomeric polymer. The elastomeric polymer can be any of those described herein. The entire compressible part can be formed during a single print process using any of the printing processes described herein. For instance, the entire compressible part can be formed and then cured together in a single print. Fused deposition modeling has the advantage of allowing the entire part to be printed using an elastomer material.

Figure 3C:
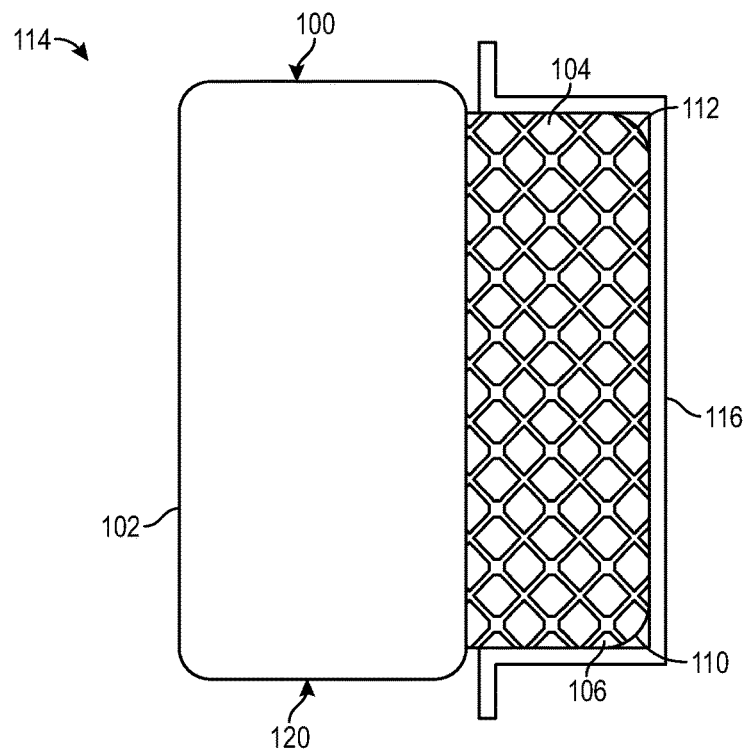
FIG. 3C illustrates a compression fit system comprising the compressible part and a receptacle for receiving the compressible part, according to an example of the present disclosure.

The compressible part 100 can be employed in applications where a polymer part is employed to provide a friction fit. For example, the compressible part 100 can be employed as part of a compression fit system 114. As illustrated in FIG. 3C, the compression fit system 114 may comprise the compressible part 100 and a receptacle 116 for receiving the compressible part 100. Any of the compressible parts described herein can be employed as a plug 120 that is insertable into the receptacle 116 and retainable therein by friction fit. In other examples, as will be described in greater detail below, the compressible part 100 can be attached to other parts or structures to form a plug 120 for the receptacle 116. For instance, a cover 122 can be attached to the compressible part 100, as shown, for example, in FIG. 4. The plug 120 can be sized to provide for a friction fit when the plug, including at least a portion of the compressible part 100, is inserted into the receptacle 116. In an example, the receptacle 116 is an inlet positioned on an aerospace vehicle. Thus, this disclosure includes the concept of a method comprising inserting a compressible part 100, as described herein, into a receptacle and maintaining the compressible part in the receptacle by a friction fit.

The increased compressibility due to the lattice structure 106 of the compressible part 100 allows for an improved friction fit. Further, because the material of the lattice structure is chosen to provide good durability, resilience and/or elasticity, the compressible part 100 resists losing its shape over time compared to the foam plugs described herein above, and thereby can maintain the friction fit for a longer period of time.

Figure 4:
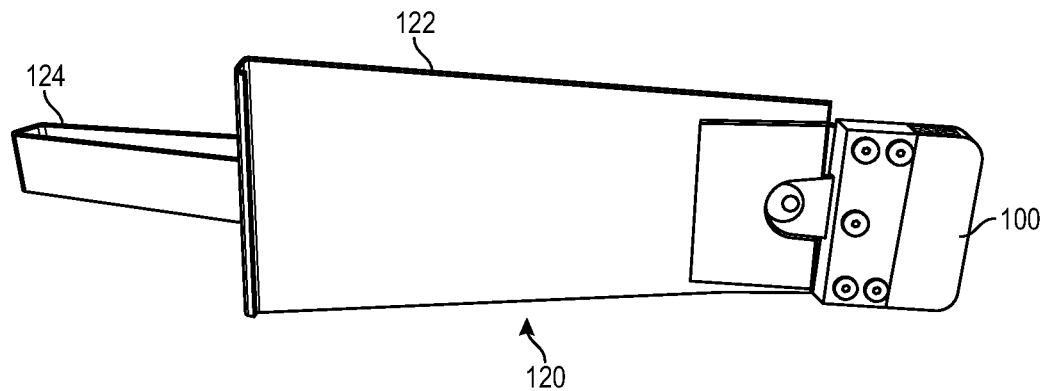
FIG. 4 illustrates a plug comprising a compressible part, according to an example of the present disclosure.
Figure 5:
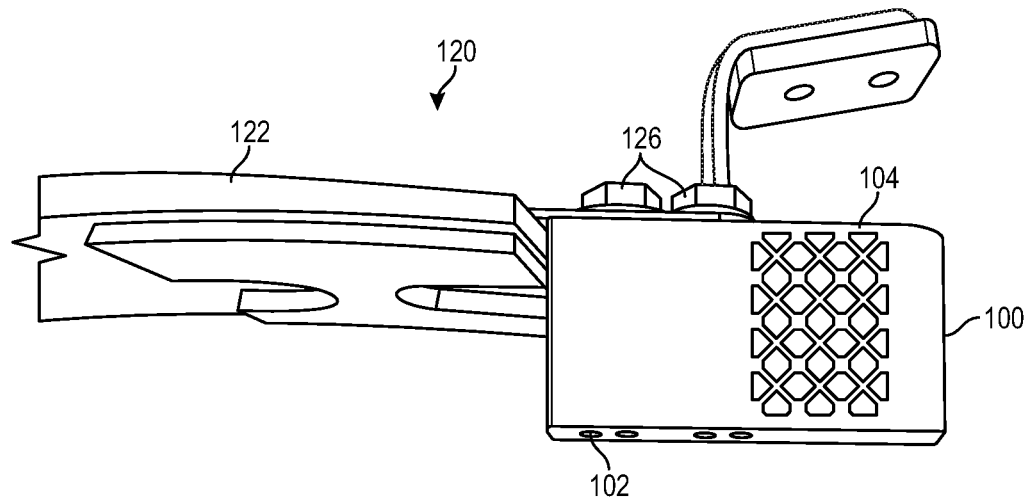
FIG. 5 illustrates a portion of a plug comprising a compressible part, according to an example of the present disclosure.
Figure 6:
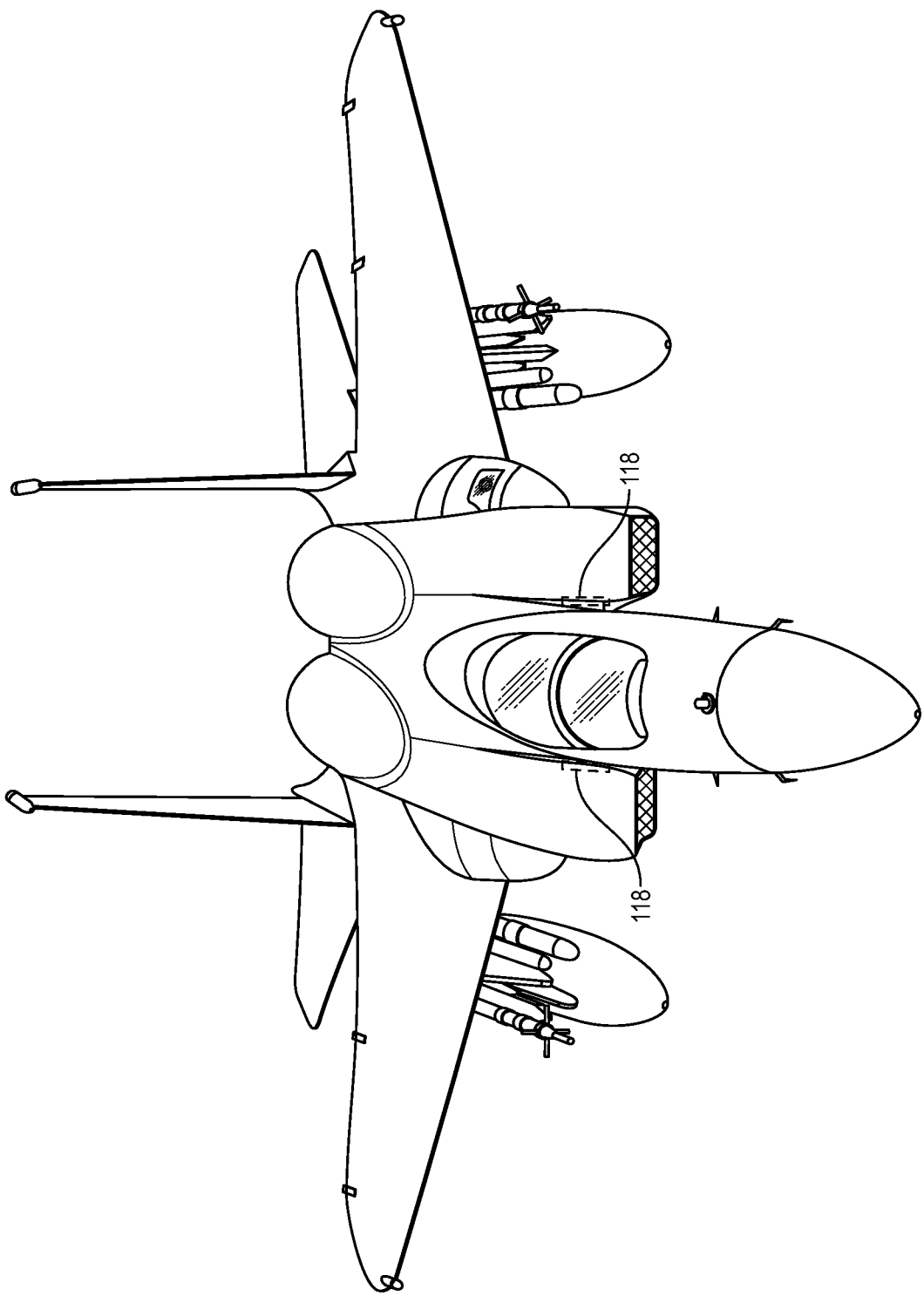
FIG. 6 illustrates an aerospace vehicle that can employ a plug comprising a compressible part, according to an example of the present disclosure.

FIGS. 4 and 5 illustrate an example of a plug 120 that can be employed, for example, as a secondary heat exchanger inlet plug for an aerospace vehicle. The secondary heat exchanger inlets 118 (shown as dashed lines in FIG. 6) are intake vents positioned between the fuselage and the main engine intakes. The secondary heat exchanger inlet plug 120 is installed in the heat exchanger inlets 118 when the aircraft is not being operated. The plug 120 comprises an outer cover 122 and an optional handle 124. The compressible part 100 is attached to the outer cover by any suitable attachment means 126, such as one or more of screws, bolts, adhesive, and so forth. The compressible part 100 can be any of the compressible parts described herein. The outer cover 122 can comprise any material in any shape or size that is appropriate for insertion into the receptacle to provide for a friction fit. As an example, the outer cover 122 comprises at least one material selected from metal, fiberglass, cloth, wood, ceramic, and polymer, such as elastic and non-elastic polymers (e.g., rubber or plastic, such as vinyl).

Example 1. Preparation and Testing of Compressible Part

The compressible part shown in FIGS. 1 and 2 was printed by a fused deposition modelling process on a Stratasys 3D printer using a single print. The material employed was TPU 92A (a thermoplastic urethane). The compressible part was used to make an inlet cover, as shown in FIG. 4. The covers were inserted into the secondary heat exchanger inlets of F15 fighter jets and maintained therein by friction fit for about two years. After two years, the compressible part continued to provide sufficient compressibility to maintain a friction fit for the inlet cover and showed little or no permanent deformation. Thus, the compressible parts of the present disclosure show increased durability (e.g., are able to maintain a friction fit for a longer period of time without incurring significant permanent deformation) compared to similar compressible parts made using blown foam rubber.

Example 2 (Comparative)

Figure 7A:
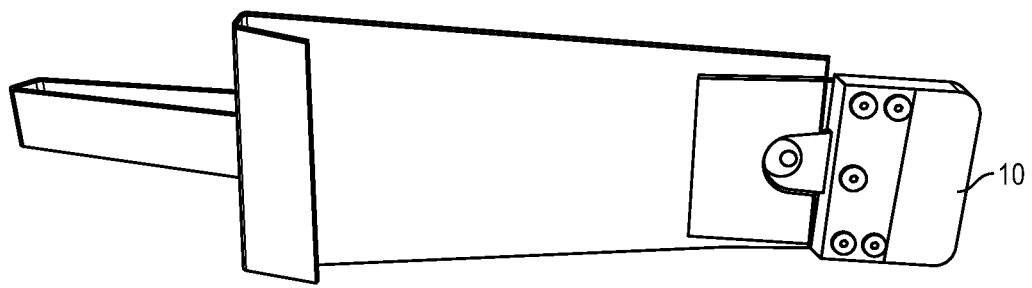
FIG. 7A illustrates a prior art plug comprising a compressible part.
Figure 7B:
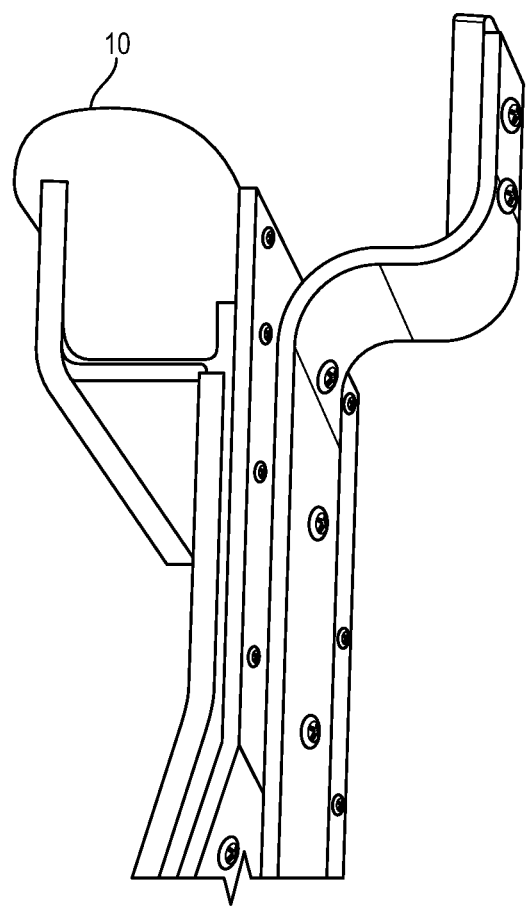
FIG. 7B illustrates a prior art plug comprising a compressible part that has been deformed.

By comparison, when a blown foam rubber part 10 was used to make an inlet cover that was inserted into a secondary heat exchanger inlet, the part 10 may only last about 6 months before significant and permanent deformation of the part occurs, as shown in FIG. 7B, thereby resulting in loss of the ability to maintain a friction fit.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A compressible aerospace vehicle part, comprising:
an inlet plug, comprising:
  a solid portion comprising a first polymer material and one or more holes positioned through the first polymer material and configured to attach the inlet plug to another structure; and
  a compressible portion comprising a lattice structure adjacent to the solid portion, the compressible portion comprising a second polymer material that is an elastomeric polymer,
wherein the inlet plug comprises a rectangular prism,
wherein the lattice structure is configured to provide for increased elastic deformation of the compressible part under compressive stress compared to the same compressible part made completely of the elastomeric polymer in solid form, and
wherein the lattice structure comprises more than one lattice pattern.

2. The compressible aerospace vehicle part of claim 1, wherein the compressible part is a pad.

3. The compressible aerospace vehicle part of claim 1, wherein the first polymer material and the second polymer material are the same elastomeric polymer.

4. The compressible aerospace vehicle part of claim 1, wherein the compressible part has a length dimension, a height dimension and a width dimension, the compressible portion extending for 10 to 95% of the height dimension of said compressible part.

5. The compressible aerospace vehicle part of claim 4, wherein the compressible portion extends for 70% to 100% of the length dimension; and 70% to 100% of the width dimension of said compressible part.

6. The compressible aerospace vehicle part of claim 4, wherein the height dimension ranges from 2 inches to 4 inches, the length ranges from 1 inch to 4 inches, and the width ranges from 0.5 inch to 1.5 inches.

7. The compressible aerospace vehicle part of claim 4, wherein the compressible portion has a first width edge and a second width edge opposing the first width edge, the first width edge and the second width edge being curved.

8. The compressible aerospace vehicle part of claim 1, wherein the elastomeric material has a Shore A Hardness of from 50 to 100.

9. The compressible aerospace vehicle part of claim 1, wherein the compressible portion comprises from 10% to 90% by volume of the compressible part.

10. The compressible aerospace vehicle part of claim 1, wherein the elastomeric material is polyurethane, polyethylene plastic, rubber or mixtures thereof.

11. The compressible aerospace vehicle part of claim 1, wherein the elastomeric material has a tensile strength of from 5 MPa to 15 MPa.

12. The compressible aerospace vehicle part of claim 1, wherein the elastomeric material has an elongation at break of 210% to 410%.

13. A method, comprising printing the compressible aerospace vehicle part of claim 1 using a three-dimensional printing technique.

14. The compressible aerospace vehicle part of claim 1, wherein the more than one lattice pattern comprises a first lattice pattern and a second lattice pattern, wherein the first lattice pattern is offset from the second lattice pattern.

15. The compressible aerospace vehicle part of claim 14, wherein:
the first lattice pattern comprises a first pattern of repeating geometric shapes and the second pattern comprises a second pattern of repeating geometric shapes; and
the second pattern of repeating geometric shapes is rotated at an angle in a first plane relative to the first pattern of repeating geometric shapes.

16. The compressible aerospace vehicle part of claim 15, wherein the angle is 90 degrees.

17. The compressible aerospace vehicle part of claim 15, wherein the first pattern of repeating geometric shapes is the same as the second pattern of repeating geometric shapes.

18. A compressible part, comprising:
an inlet plug, comprising:
  an outer cover; and
  a compressible part attached to the outer cover, the compressible part comprising:
    a solid portion comprising a first polymer material and one or more holes positioned through the first polymer material and configured to attach the inlet plug to another structure; and
    a compressible portion comprising a lattice structure adjacent to the solid portion, the compressible portion comprising a second polymer material that is an elastomeric polymer, wherein
  the inlet plug comprises a rectangular prism,
  the lattice structure is configured to provide for increased elastic deformation of the compressible part under compressive stress compared to the same compressible part made completely of the elastomeric polymer in solid form, and
  the lattice structure comprises more than one lattice pattern.

19. The compressible part of claim 18, where the inlet plug is a secondary heat exchanger inlet plug for an aerospace vehicle.

20. The compressible part of claim 18, wherein the first polymer material and the second polymer material are the same elastomeric polymer.

21. A compression fit system, comprising;
an inlet plug comprising:
- a compressible part and a receptacle for receiving the compressible part, the receptacle sized so that the compressible part is insertable in the receptacle and maintainable therein by a friction fit, the compressible part comprising:
  - a solid portion comprising a first polymer material and one or more holes positioned through the first polymer material and configured to attach the inlet plug to another structure; and
  - a compressible portion comprising a lattice structure adjacent to the solid portion, the compressible portion comprising a second polymer material that is an elastomeric polymer, wherein
- the inlet plug comprises a rectangular prism,
- the lattice structure is configured to provide for increased elastic deformation of the compressible part under compressive stress compared to the same compressible part made completely of the elastomeric polymer in solid form, and
- the lattice structure comprises more than one lattice pattern.

22. The compression fit system of claim 21, further comprising a cover attached to the compressible part.

23. The compression fit system of claim 21, wherein the receptacle is an inlet positioned on an aerospace vehicle.

24. The compression fit system of claim 21, wherein the first polymer material and the second polymer material are the same elastomeric polymer.

25. A method comprising inserting the compressible part of claim 21 into the receptacle and maintaining the compressible part in the receptacle by a friction fit.

26. A method of making a compressible part, the method comprising:
forming an inlet plug, comprising a compressible part by three-dimensional printing, the compressible part comprising: (i) a solid portion comprising a first polymer material and one or more holes positioned through the first polymer material and configured to attach the inlet plug to another structure, and (ii) a compressible portion comprising a lattice structure adjacent to the solid portion, the compressible portion comprising a second polymer material that is an elastomeric polymer,
wherein the lattice structure increases elastic deformation of the compressible part under compressive stress compared to the same compressible part made completely of the elastomeric polymer in solid form and the lattice structure comprises more than one lattice pattern, and
wherein the inlet plug comprises a rectangular prism.

27. The method of claim 26, wherein the three-dimensional printing is fused deposition modelling.

28. The method of claim 26, wherein the first polymer material and the second polymer material are the same elastomeric polymer, the entire compressible part being formed during a single print process.

29. The method of claim 26, further comprising determining a desired compressibility prior to forming the compressible part; and configuring the lattice structure so that the compressible part provides a desired compressibility.

* * * * *